(12) United States Patent
Hoffman et al.

(10) Patent No.: US 12,531,496 B2
(45) Date of Patent: Jan. 20, 2026

(54) SYSTEM AND METHOD FOR REDUCING ENERGY LOSS FROM MULTIPLE INVERTERS UTILIZING A SHARED DC BUS

(71) Applicant: Rockwell Automation Technologies, Inc., Milwaukee, WI (US)

(72) Inventors: Jonathan D. Hoffman, Milwaukee, WI (US); Adam M. Shea, Fox Point, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 210 days.

(21) Appl. No.: 18/243,786

(22) Filed: Sep. 8, 2023

(65) Prior Publication Data

US 2025/0088007 A1  Mar. 13, 2025

(51) Int. Cl.
*H02P 3/14* (2006.01)
*H02J 1/06* (2006.01)
*H02M 7/797* (2006.01)

(52) U.S. Cl.
CPC .................. *H02P 3/14* (2013.01); *H02J 1/06* (2013.01); *H02M 7/797* (2013.01)

(58) Field of Classification Search
CPC .............. H02P 3/14; H02J 1/06; H02M 7/797
See application file for complete search history.

(56) References Cited

U.S. PATENT DOCUMENTS

| | | | |
|---|---|---|---|
| 7,408,319 B2 * | 8/2008 | Lloyd | H02P 5/74 318/729 |
| 9,093,804 B2 | 7/2015 | Matocky et al. | |
| 2008/0079373 A1 * | 4/2008 | Melfi | H02P 3/18 318/63 |
| 2011/0241580 A1 * | 10/2011 | Winterhalter | H02P 27/06 318/400.3 |
| 2014/0361613 A1 * | 12/2014 | Huang | H02J 1/06 307/12 |
| 2024/0104281 A1 * | 3/2024 | Shen | G06F 30/36 |

* cited by examiner

*Primary Examiner* — Harry R Behm
(74) *Attorney, Agent, or Firm* — Boyle Fredrickson, S.C.

(57) ABSTRACT

A system and method for reducing energy loss in a multiple inverter system provides a DC voltage to multiple inverters via a shared DC bus. Each inverter is configured to control operation of a motor operatively connected to a corresponding inverter. An amplitude of the DC voltage present on the DC bus is monitored, and each inverter selectively draws current from or delivers current to the DC bus. An amplitude of the current drawn from or delivered to the DC bus is monitored by each inverter. A level of energy delivered by at least one of the inverters to the DC bus is determined when the amplitude of the DC voltage exceeds a predefined threshold during a first operation of the multiple inverter system. At least one subsequent operation of the multiple inverter system is adapted responsive to the level of energy delivered to the DC bus.

14 Claims, 12 Drawing Sheets

SYSTEM AND METHOD FOR REDUCING ENERGY LOSS FROM MULTIPLE INVERTERS UTILIZING A SHARED DC BUS

BACKGROUND INFORMATION

The subject matter disclosed herein relates to reducing energy loss on a shared DC bus. More specifically, energy transferred between a shared DC bus and multiple inverters is monitored and operation of the system is adapted to reduce excess energy dissipated from the shared DC bus.

As is known to those skilled in the art, a shared DC bus receives power from a source and distributes the power to multiple inverters. The source may be, for example, a rectifier connected to a utility power supply. The rectifier converts an Alternating Current (AC) voltage to a Direct Current (DC) voltage, where the DC voltage is provided to the shared DC bus. The rectifier may be rated to conduct sufficient power for multiple inverters connected to the shared DC bus. Each inverter, in turn, may draw a portion of the power available from the DC bus and convert the DC voltage back to a controlled AC voltage. The controlled AC voltage is provided to a motor connected to the inverter, where the AC voltage is controlled to achieve desired operation of the motor.

As is also known to those skilled in the art, motors may operate in either a motoring operating mode, in which power is drawn from the shared DC bus, or in a regenerative operating mode, in which energy is provided back to the shared DC bus. When the motors are operating in the motoring operating mode, the inverters draw power from the shared DC bus and provide power to the motors. As the inverters draw power from the shared DC bus, the amplitude of the DC voltage present on the shared DC bus may droop. During periods in which the inverters draw power from the shared DC bus, the rectifier is responsible for supplying sufficient power to the shared DC bus to maintain the amplitude of the DC bus at a desired level. When the motors are operating in the regenerative operating mode, the inverters transfer power generated by the motors back to the shared DC bus. As the inverters transfer power to the shared DC bus, the amplitude of the DC voltage present on the shared DC bus may increase. It is necessary to prevent the amplitude of the DC voltage from increasing too much to prevent damage or failure of components in the inverters or in the rectifier connected to the DC bus.

Historically, it was known to selectively connect a shunt resistor to the shared DC bus. A voltage sensor monitors the amplitude of DC voltage present on the DC bus and connects the shunt resistor to the DC bus when the amplitude of the DC voltage exceeds a predefined threshold. The shunt resistor establishes an electrical conduction path from the DC bus through the shunt resistor. The amplitude of current flowing through the shunt resistor is equal to the amplitude of the DC voltage divided by the resistance value of the shunt resistor. The power dissipated in the shunt resistor is equal to the square of the amplitude of current flowing through the resistor times the resistance value of the shunt resistor. In order to prevent the amplitude of the DC voltage from continuing to rise after the predefined threshold is reached, the resistance value of the shunt resistor is selected such that the power dissipated in the shunt resistor is at least as great as the level of regenerative power expected to be generated by the motor.

However, power dissipated in the shunt resistor is given off in the form of heat. A system with multiple motors, where one or more of the motors may be operating in a regenerative operating state frequently or for an extended duration of time may cause a substantial amount of heat to be generated by the shunt resistor. The system must be configured to manage the thermal energy given off by the shunt resistor. The thermal management may require a fan, a heatsink, mounting in a location where the heat may be dissipated external from a control cabinet, or a combination thereof. The thermal management requirements create additional expense. Additionally, the energy dissipated in the shunt resistor as thermal energy is typically waste energy and reduces the efficiency of the system.

Thus, it would be desirable to provide an improved method of managing regenerative energy generated by a motor.

It would also be desirable to provide an improved method of managing regenerative energy generated by multiple motors, where each motor is controlled by an inverter connected to a shared DC bus.

BRIEF DESCRIPTION

According to one embodiment of the invention, a method for reducing energy loss in a multiple inverter system provides a DC voltage to multiple inverters via a shared DC bus. Each of the inverters is configured to control operation of a motor operatively connected to a corresponding inverter. An amplitude of the DC voltage present on the shared DC bus is monitored, and each of the inverters selectively draws current from or delivers current to the shared DC bus. An amplitude of the current drawn from or delivered to the shared DC bus is monitored by each of the inverters. A level of energy delivered by at least one of the inverters to the shared DC bus is determined when the amplitude of the DC voltage exceeds a predefined threshold during a first operation of the multiple inverter system. At least one subsequent operation of the multiple inverter system is adapted responsive to the level of energy delivered to the shared DC bus when the amplitude of the DC voltage exceeds the predefined threshold.

According to another embodiment of the invention, a system for reducing energy loss in a multiple inverter system includes a DC bus operative to conduct a DC voltage, multiple inverters electrically connected to the DC bus, a sensor operative to generate a feedback signal corresponding to an amplitude of the DC voltage present on the DC bus, and a controller. Each of the inverters is operative to transfer power between the DC bus and a motor operatively connected to a corresponding inverter and to monitor an amplitude of current drawn from or delivered to the DC bus by the corresponding inverter. The controller is operative to receive the feedback signal corresponding to the amplitude of the DC voltage present on the DC bus and receive data from each of the inverters corresponding to the amplitude of current drawn from or delivered to the DC bus by the corresponding inverter. A level of energy delivered by the inverters to the DC bus when the amplitude of the DC voltage exceeds a predefined threshold is determined during a first operation of the system, and at least one subsequent operation of the system is adapted responsive to the level of energy delivered to the DC bus when the amplitude of the DC voltage exceeds the predefined threshold.

According to one aspect of the invention, a motion command is generated with a central controller for the motor connected to each of the inverters. The motion command for the motor connected to at least a portion of the inverters is shifted in time to align at least the portion of the time when inverters are drawing current from the shared DC bus with a portion of the time when inverters are delivering current to the shared DC bus.

According to another aspect of the invention, adapting at least one subsequent operation of the multiple inverter system includes detecting a total amount of energy delivered by the inverters to the shared DC bus when the amplitude of the DC voltage exceeds the predefined threshold and determining an additional capacitance required to absorb at least a portion of the total amount of energy delivered by the inverters to the shared DC bus.

According to still another embodiment of the invention, a method for reducing energy loss in a multiple inverter system converts an AC voltage to a DC voltage with a rectifier and delivers the DC voltage from the rectifier to multiple inverters via a shared DC bus. Each of the inverters is configured to control operation of a motor operatively connected to a corresponding inverter. An amplitude of the DC voltage present on the shared DC bus is monitored, and a level of energy delivered by the plurality of inverters to the shared DC bus when the amplitude of the DC voltage exceeds a predefined threshold during a first operation of the multiple inverter system is determined. At least one subsequent operation of the multiple inverter system is adapted responsive to determining the level of energy delivered to the shared DC bus when the amplitude of the DC voltage exceeds the predefined threshold.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
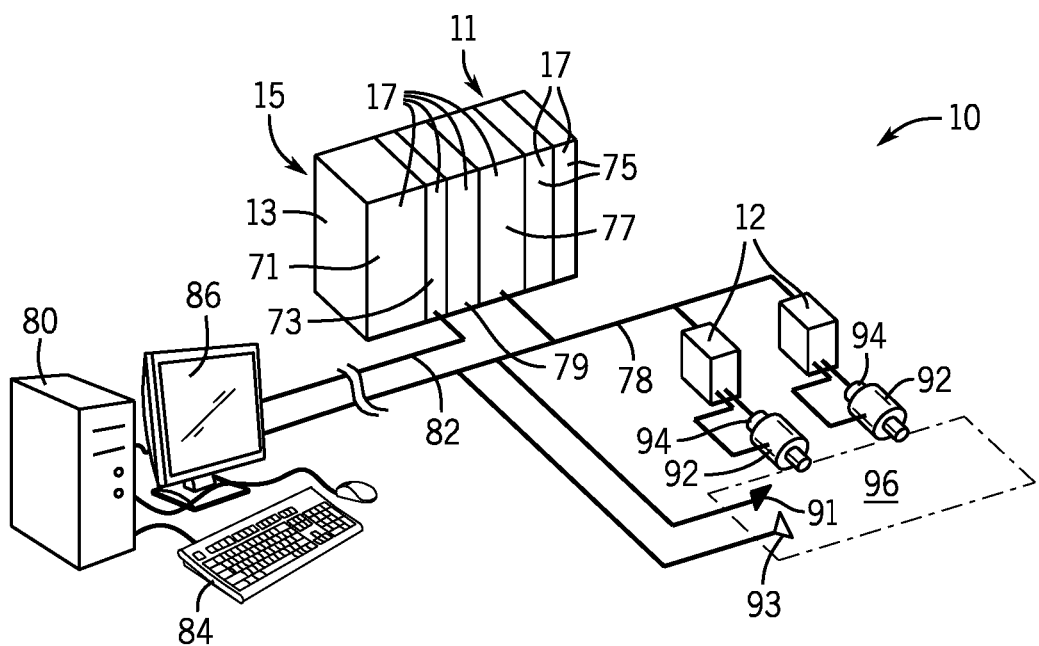
FIG. 1 is an exemplary industrial control system in which embodiments of the present invention are incorporated.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved method of managing regenerative energy generated by multiple motors, where each motor is controlled by an inverter connected to a shared DC bus. A rectifier front end converts an AC voltage to a DC voltage for distribution to multiple motor drives. Each motor drive receives the DC voltage via a shared DC bus. During operation, each motor drive may either draw power from the shared DC bus, when the motor controlled by the motor drive is operating in a motoring mode, or deliver power back to the shared DC bus, when the motor controlled by the motor drive is operating in a regenerative mode. A controller monitors power flow on the shared DC bus. If too many motors operate in a regenerative mode in tandem, the power delivered to the shared DC bus may cause the bus voltage to rise, and a shunt resistor connected to the DC bus may dissipate this excess energy. The controller records the power flow during a sequence of operations by each of the motor drives. The controller may then adapt operation of the controlled system to reduce the total energy being delivered to the shared DC bus from the motor drives. According to one aspect of the invention, the controller may shift in time when a motor is operating to more evenly distribute motoring and regenerative operation of each of the inverters. According to another aspect of the invention, the controller may determine an additional amount of capacitance to be connected to the DC bus to reduce or eliminate a need for the shunt resistor.

Referring initially to FIG. 1, an industrial control system 10 may include an industrial controller 11 which has multiple modules 17 and a backplane, or other communication bus, 15 providing communication between the multiple modules 17. The modules 17 may be installed within a housing or individually on a mounting bracket, such as a DIN rail. The communication bus 15 is typically a backplane coupled between modules 17 via suitable connectors. The modules may include, for example, a power supply module 71, a processor module 73, one or more I/O modules 75, a motion control module 79, and a network module 77. The network module 77, processor module 73, or a combination thereof may communicate on an industrial control network 78, such as ControlNet®, DeviceNet®, or EtherNet/IP®, between the industrial controller 11 and other devices connected to the industrial controller. The network 78 may join with other devices in the controlled machine or process 96, including, for example, actuators 91, controlled by output signals from the industrial controller 11, or sensors 93, providing input signals to the industrial controller. The industrial controller 11 may be, for example, a programmable logic controller (PLC), a programmable automation controller (PAC), or the like. It is contemplated that the industrial controller 11 may include still other modules, such as an axis control module, or additional racks connected via the industrial control network 78. Optionally, the industrial controller 11 may have a fixed configuration, for example, with a predefined number of network and I/O connections.

The industrial control network 78 may join the industrial controller 11 to remote I/O modules (not shown) and one or more remote motor drives 12, the latter of which may communicate with corresponding electric motors 92 and position feedback devices 94 to provide for controlled motion of the electric motors 92. The controlled motion of the electric motors, in turn, controls associated industrial machinery or processes 96. A computer 80 may communicate with the industrial controller 11 and/or the motor drives 12 over the industrial control network 78 or via a dedicated communication channel 82, for example, connecting with the processor module. The computer 80 may be a portable computer connected to the industrial controller 11 for configuration. The computer 80 may be a standard desktop or laptop computer and include a keyboard 84, display screen 86, and the like to permit the entry and display of data and the operation of a configuration program by a human operator. Optionally, the computer 80 may be an industrial computer or a Human Machine Interface (HMI) included in the control cabinet which may similarly permit the entry and display of data and configuration of the industrial controller by a human operator.

Figure 2:
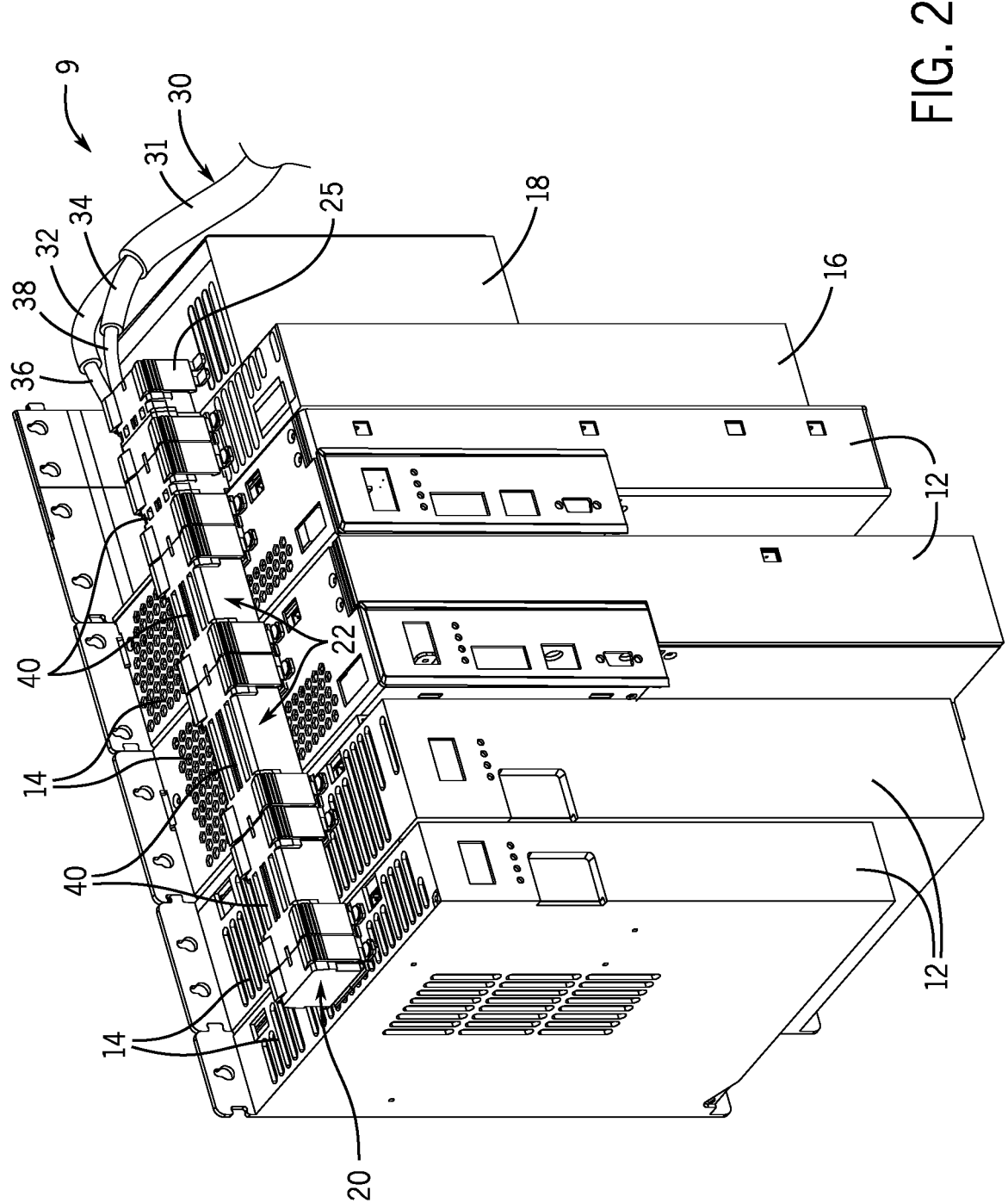
FIG. 2 is an isometric view of an exemplary multi-axis drive system incorporating a shared DC bus between modules for the exemplary industrial control system of FIG. 1.
Figure 3:
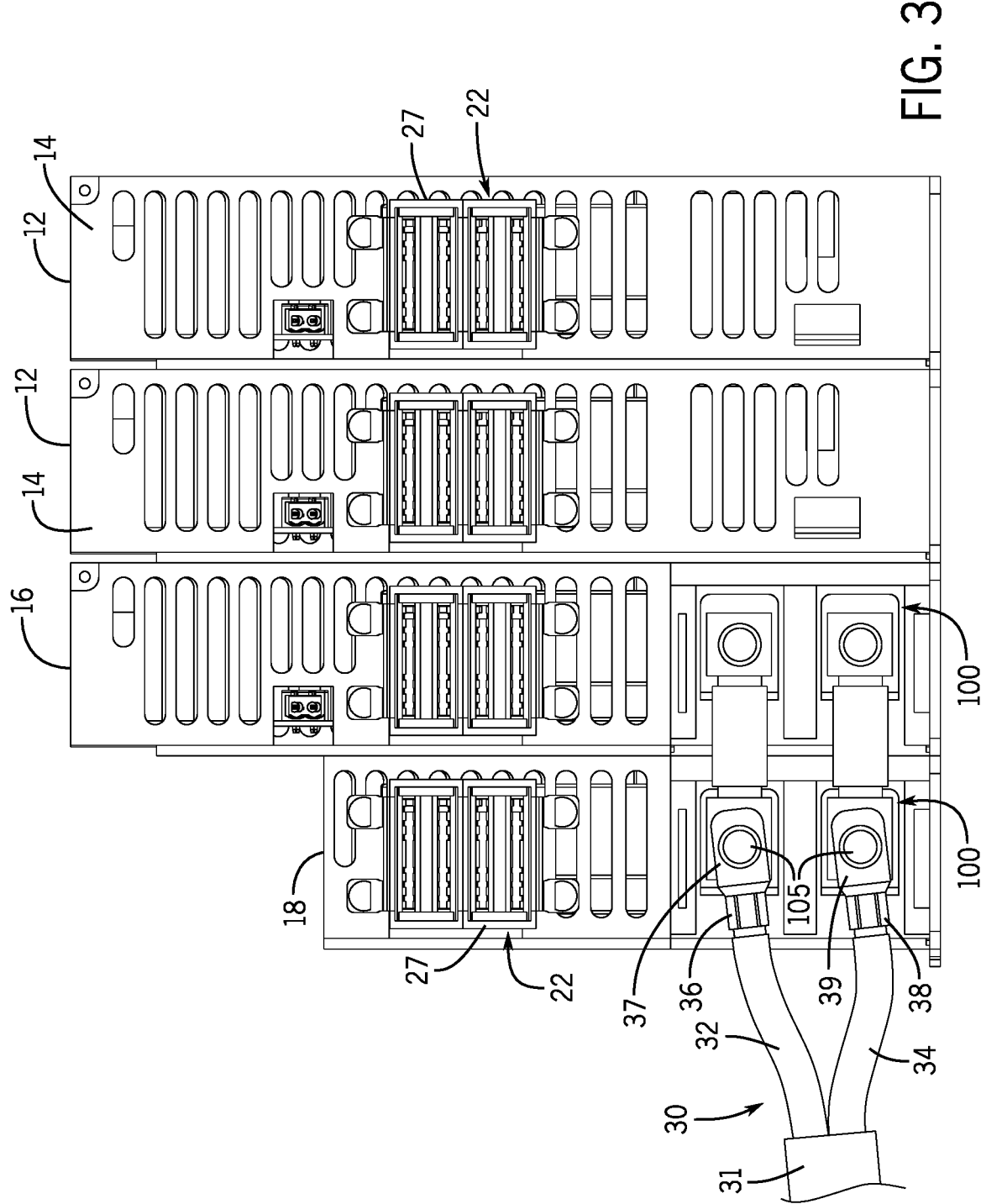
FIG. 3 is a partial top plan view of the exemplary multi-axis drive system and shared DC bus from FIG. 2.
Figure 4:
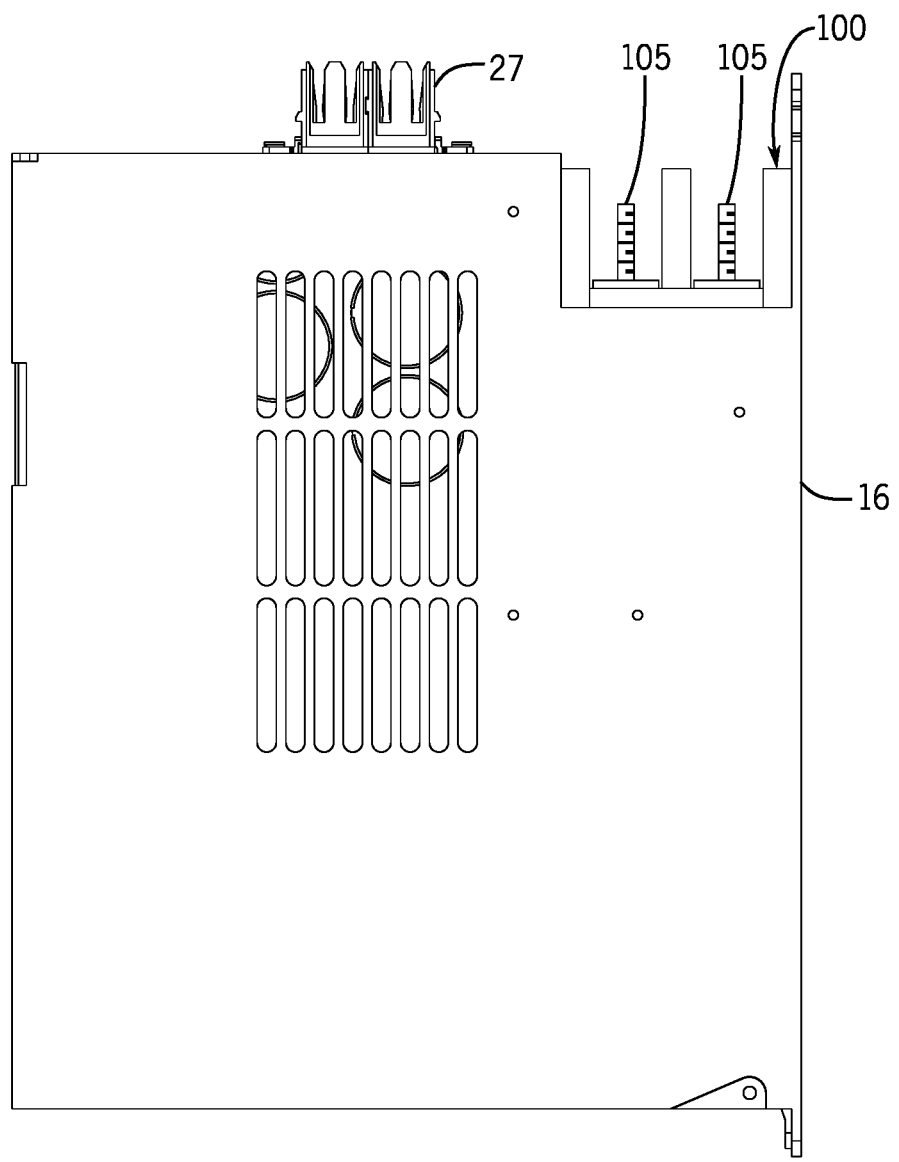
FIG. 4 is a side elevation view of one of the modules of FIG. 2.

Turning next to FIGS. 2-4, an exemplary multi-axis drive system 9 from the industrial control system 10 which incorporates a shared DC bus 20 is illustrated. The multi-axis drive system 9 includes multiple modules, such as motor drives 12, a capacitance module 16, and an extension module 18. Each motor drive 12 may be configured to control operation of one motor, or axis, of the multi-axis drive system 9. Each motor drive 12 may include, for example, an inverter to convert a DC voltage to an AC voltage, a rectifier to convert an AC voltage to a DC voltage, a converter to convert a DC voltage at a first voltage potential to a DC voltage at a second voltage potential, or a combination thereof. According to the illustrated embodiment, each motor drive 12 receives power from the shared DC bus 20 and includes an inverter 330 (sec also FIG. 9) operable to convert the power received from the shared DC bus 20 to a desired AC voltage to control operation of a motor 92 connected to the motor drive 12.

Figure 7:
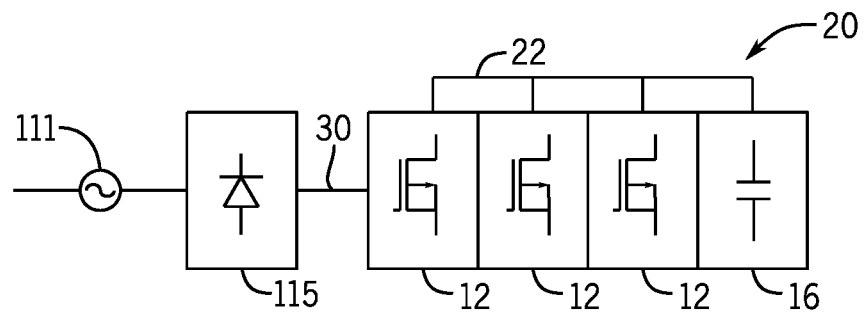
FIG. 7 is a block diagram representation of a first exemplary distributed motor drive system incorporating one embodiment of the invention.

The shared DC bus 20 is connected to a remote power source, such as a rectifier module 115 (see also FIG. 7) via a DC bus cable 30. The DC bus cable 30 includes a first conductor 32 and a second conductor 34 contained within an insulated cable jacket 31 or sheath. A first lug 36 is connected to the end of the first conductor 32 and a second lug 38 is connected to the end of the second conductor 34. Each lug 36, 38 may be connected to the respective conductor 32, 34 by crimping, soldering, or any other suitable method. Each lug 36, 38 includes a first mating member 37, 39 operable to engage a complementary mating member mounted to the extension module 18. According to the illustrated embodiment, the first mating member 37, 39 is a generally planar surface with a hole extending through the planar surface. The complementary mating member is a threaded rod, such as a mounting bolt 105 on a DC bus connector 100 (see e.g., FIG. 3). The hole in the planar surface is placed over the mounting bolt and a nut is then threaded on to the mounting bolt to secure the lug 36, 38 to the DC bus connector 100.

Figure 5:
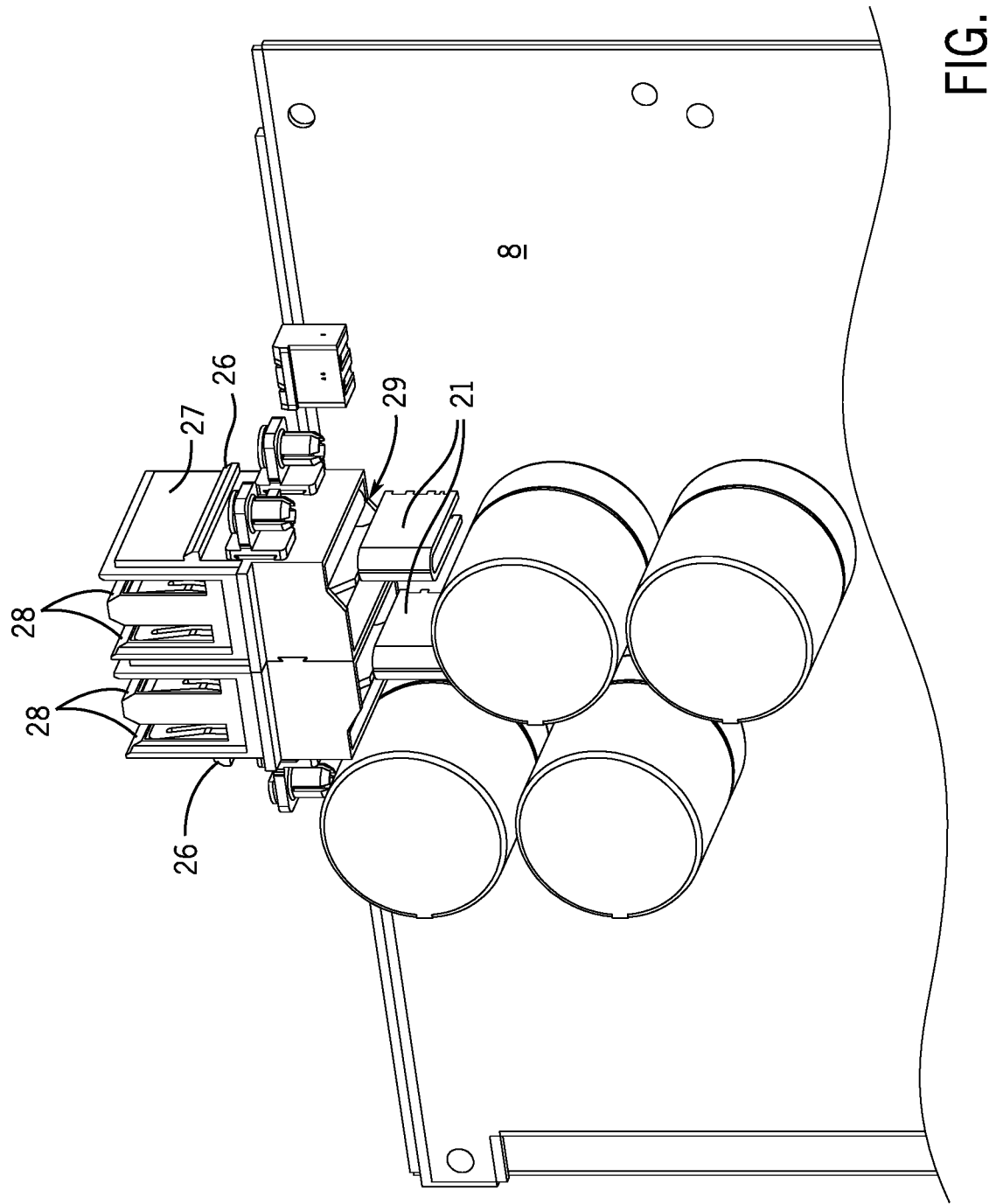
FIG. 5 is an isometric view of a circuit board from one of the modules of FIG. 2 with a DC bus connector and capacitors mounted thereto.

An illustrated connector system 22 for the multi-axis drive system 9 includes a bus bar assembly 40 and a bus bar connector 27 on each motor drive 12. The illustrated connector system 22 allows for a fast, modular connection of the shared DC bus 20 between modules 12, 16, 18. According to the illustrated embodiment, the bus bar connector 27 is mounted to the top surface 14 of each module 12, 16, 18. Optionally, the bus bar connector 27 may be connected to another surface of the modules 12, 16, 18 such as the front, rear, or lower surface as long the surfaces of adjacent modules 12, 16, 18 on which the bus bar connector 27 is mounted are substantially in the same geometric plane. With reference also to FIG. 5, the bus bar connector 27 includes at least one external slot 28 with an opening external to the module 12, 16, 18, where each external slot 28 is configured to receive a bus bar 60 (see e.g., FIG. 6) within the slot 28. The bus bar connector 27 further includes at least one internal slot 29 with an opening internal to the module 12, 16, 18, where each internal slot 29 is configured to engage a DC bus stab 21 mounted to a circuit board 8 within the module 12, 16, 18.

Figure 6:
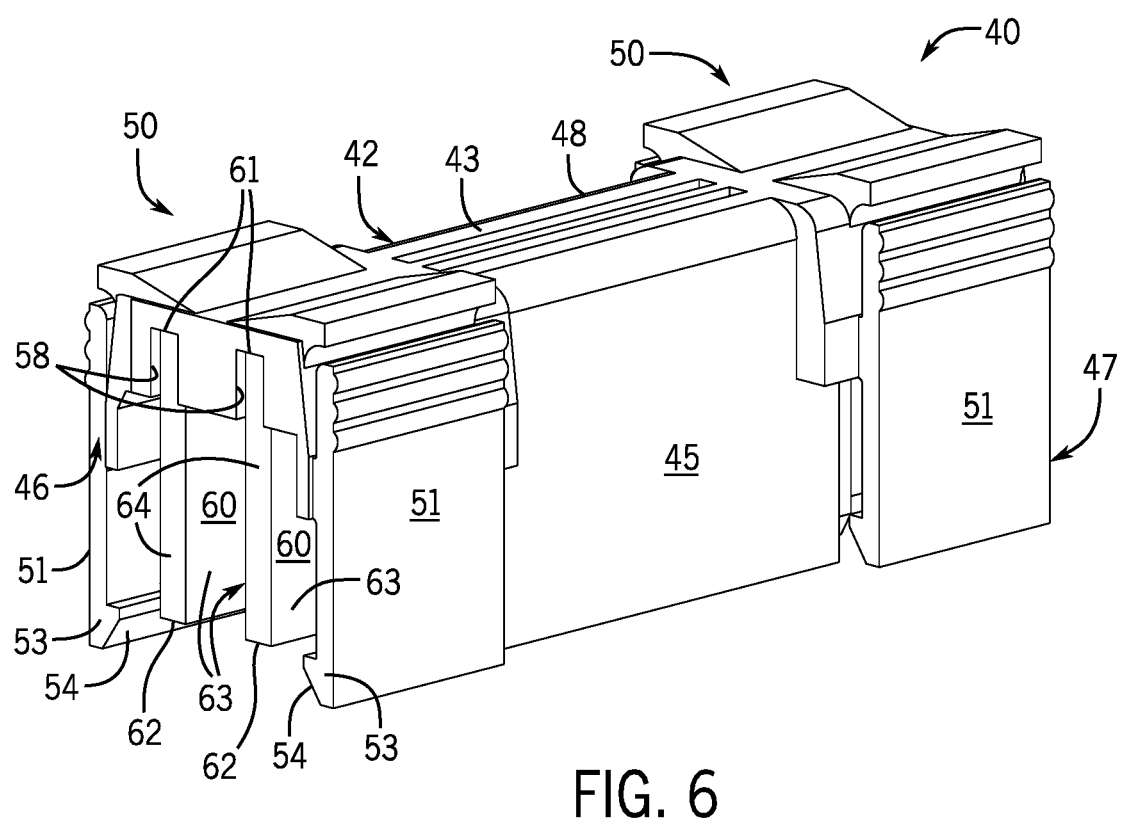
FIG. 6 an isometric view of a bus bar assembly for the shared DC bus according to one embodiment of the invention.

The illustrated connector system 22 also includes a bus bar assembly 40 used to establish an electrical connection between bus bar connectors 27 on adjacent modules 12, 16, 18. Turning next to FIG. 6, a bus bar assembly 40 according to one embodiment of the invention is illustrated. The bus bar assembly 40 includes a housing 42 and at least one bus bar 60. The housing 42 is a generally "u" shaped member having an upper wall 43, a pair of side walls 45, a first end 46, and a second end 47. A clip portion 50 is integrally formed in the housing 42 on each side and at each of the first end 46 and the second end 47 of the housing 42. Each side wall 45 is joined to the upper wall 43 along an upper edge 48 of the housing 42 and extends longitudinally between clip portions 50 at each end 46, 47 of the housing 42. The clip portion 50 includes an arm 51 pivotally mounted to and extending downward from the upper edge 48 of the housing 42. According to the illustrated embodiment, the arm 51 is integrally formed with the housing 42 of a resilient material allowing the lower edge of the arm 51 to pivot about the edge 48 and return to its original position. The inner face of the arm 51 includes a retaining tab 53 extending longitudinally along the inner face of the arm 51 and proximate to the lower edge of the arm 51. The retaining tab 53 projects inward into the housing 42 and includes a beveled surface 54 sloped outward and downward from the inner face of the retaining tab 53. The beveled surface 54 of the retaining tab 53 on the clip 50 is complementary to a beveled outer edge of a retaining member 26 on the bus bar connector 27. The housing 42 also includes at least one slot 58 configured to receive the bus bars 60. The slots 58 establish a friction fit between each bus bar 60 and the housing 42. The housing 42 may further include one or more bus bar retaining members (not shown) that extend around the periphery of the bus bar 60. The bus bar retaining member further defines the slot 58 in which each bus bar 60 is received. Separate bus bar retaining members may be located proximate to each end 46, 47 of the housing 42 or a single bus bar retaining member may be centrally located within, or extend substantially the length of, the housing 42.

The illustrated embodiment of the bus bar assembly 40 includes two bus bars 60. Optionally, the bus bar assembly 40 may include four bus bars 60 or other numbers of bus bars 60 corresponding to the number of external slots 28 on the bus bar connector 27. Each bus bar 60 is formed of a conductive material, such as copper. Each bus bar 60 has an upper surface 61, a lower surface 62, and a pair of side surfaces 63 each of which extends between opposite ends 64, defining a generally rectangular bar. The height of each side surface 63 is greater than the width of the upper surface 61 and the lower surface 62 and the bus bar 60 extends longitudinally within the housing 42 substantially between the first end 46 and the second end 47 of the housing 42. Each bus bar 60 may be inserted into one of the slots 58 of the housing 42 and be retained by a friction fit and/or an adhesive. Optionally, the housing 42 may be molded over the bus bars 60. The bus bar assembly 40 is used to establish an electrical connection between bus bar connectors 27 on adjacent modules 12, as shown in FIG. 2. A suitable connector system 22 for use with various embodiments of the present invention is disclosed in U.S. Pat. No. 9,093,804, which is owned by Rockwell Automation Technologies, Inc. and which is hereby incorporated by reference.

The connector system 22, described above, provides a fast, modular connection of the shared DC bus 20 between modules 12, 16, 18 when the modules 12, 16, 18 are mounted adjacent to each other or spaced apart from each other as long as the bus bar connectors 27 are aligned with each other. Alternately, modules 12, 16, 18 may be located spaced apart from each other within a cabinet or within different cabinets at a common location or at locations remote from each other. Rather than using the bus bar assembly 40 as described above, cables 30 may extend between modules 12, 16, 18, connecting each module to the shared DC bus 20.

Figure 8:
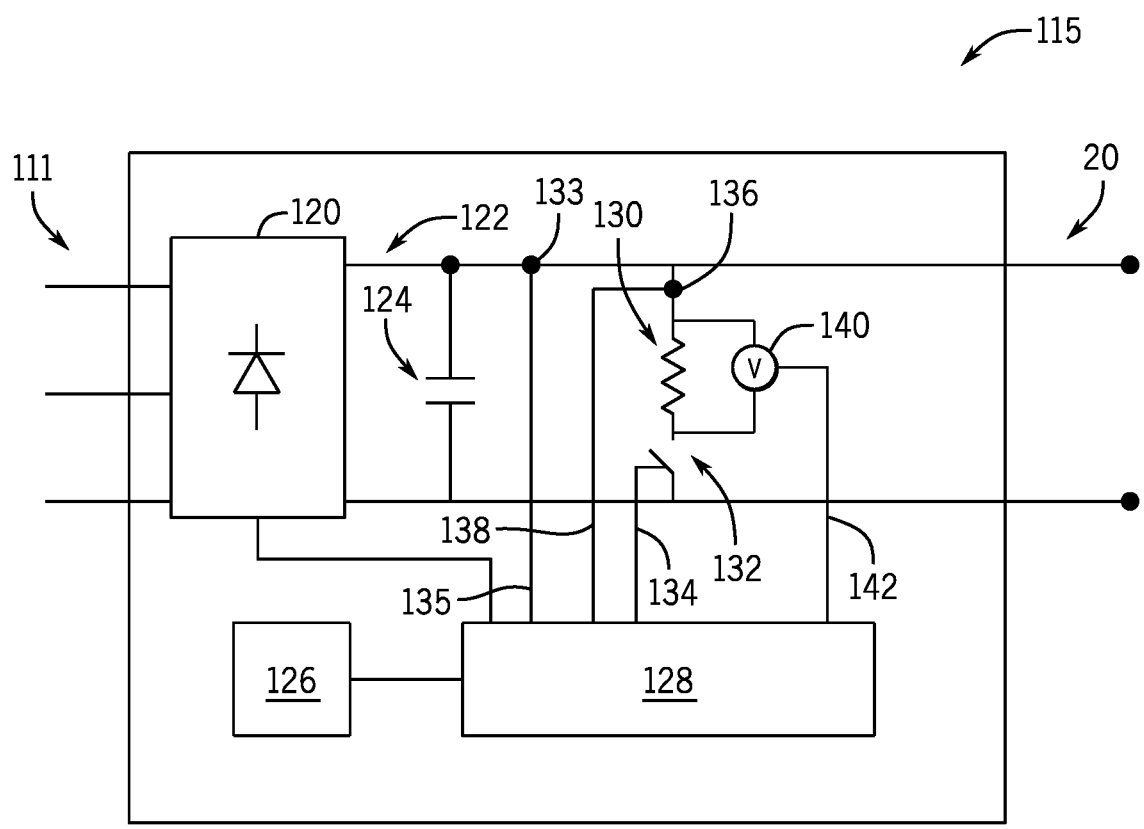
FIG. 8 is a block diagram representation of the rectifier illustrated in FIG. 7.

Turning next to FIG. 8, an exemplary rectifier module 115 is illustrated. The exemplary rectifier module 115 includes a passive rectifier 120 section. The passive rectifier section is configured to convert an AC voltage from an AC power source 111, such as the utility grid, to a DC voltage for the DC bus 122 without requiring control signals for rectification. Commonly, the passive rectifier section 120 includes multiple diodes to perform the conversion. A bus capacitance 124 is included between the positive and negative rails of the DC bus 122. The bus capacitance 124 may be multiple capacitors connected in series, in parallel, or a combination thereof, to achieve a desired capacitance. The bus capacitance 124 reduces a ripple present in the DC voltage as a result of rectification to provide a more constant value of DC voltage for the DC bus. A voltage sensor 133 on the DC bus 122 generates a feedback signal 135 corresponding to a value of voltage present on the DC bus 122. The rectifier module 115 also includes memory 126 configured to store instructions, data, and parameters for configuration of the rectifier module 115. A processor 128 is operatively connected to the memory 126 to read and execute the stored instructions.

According to the illustrated embodiment, the rectifier module 115 also includes a DC shunt resistor 130 connected across the DC bus 122 to discharge excess energy from the DC bus 122. The shunt resistor 130 may include multiple power resistors connected in series, parallel, or a combination thereof and are commonly located external from the rectifier module 115. Electrical conductors are connected between the shunt resistor 130 and terminals on the rectifier module 115 to establish an electrical connection between the shunt resistor 130 and the rectifier module 115. A switch 132 is provided internal to the rectifier module 115 and controlled by a control signal 134 to selectively establish a conduction path between the DC bus 122 and the shunt resistor 130. A current sensor 136 may be connected in the shunt path to generate a current feedback signal 138 corresponding to an amplitude of current provided to the shunt resistor 130. A voltage sensor 140 may be connected in parallel to the shunt resistor 130 and generate a voltage feedback signal 142 corresponding to an amplitude of voltage present across the shunt resistor 130. The current and voltage feedback signals 138, 142 are provided to the processor 128 and may be used to determine power dissipated in the shunt resistor 130. The rectifier module 115 may also be connected to the industrial control network 78 and may transmit data values corresponding to the voltage feedback signal from the DC bus, the voltage and/or current feedback signal on the shunt resistor 130, or the power dissipated in the shunt resistor to the industrial controller 11.

Either the processor 128 in the rectifier module 115 or the processor module 73 in the industrial controller 11 is configured to monitor the voltage level present on the DC bus 122. If a motor 92 connected to one of the motor drives 12 enters a regenerative operating mode, the motor 92 is operating as a generator and supplying energy back to the shared DC bus 20. This energy can cause the voltage present on the DC bus 20, 122 to increase. If the voltage level on the DC bus 20, 122 increases beyond a predefined threshold, a control signal 134 is generated to close the switch 132 to the shunt resistor 130, connecting the shunt resistor 130 across the DC bus 122. The excess energy will be dissipated across the shunt resistor 130 as heat. When the motor 92 is no longer operating in a regenerative operating mode or the shunt resistor has dissipated a sufficient level of energy, the voltage level on the DC bus 20, 122 returns to a desired operating level, the control signal 134 to the switch 132 is disabled, and the shunt resistor 130 is disconnected from the DC bus 122.

Figure 9:
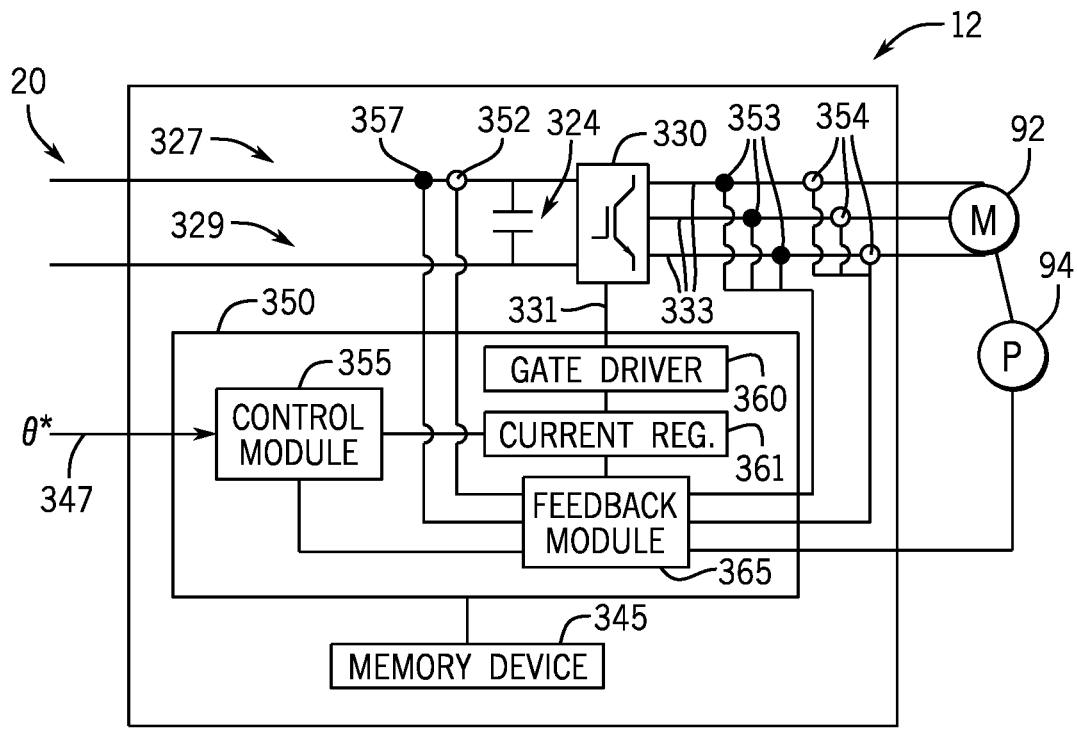
FIG. 9 is a block diagram representation of one of the motor drives illustrated in FIG. 7.

With reference also to FIG. 9, a motor drive 12, according to one embodiment of the invention is illustrated. The motor drive 12 is configured to receive the DC voltage from the DC bus 20. The DC voltage is present between a positive rail 327 and a negative rail 329 of the DC bus 20. A DC bus capacitor 324 is connected between the positive and negative rails, 327 and 329. The bus capacitor 324 absorbs energy from and delivers energy to the DC bus 20. The capacitance helps maintain the DC bus voltage at a desired amplitude of DC voltage. It is understood that the DC bus capacitor 324 may be a single capacitor or multiple capacitors connected in parallel, in series, or a combination thereof.

Figure 10:
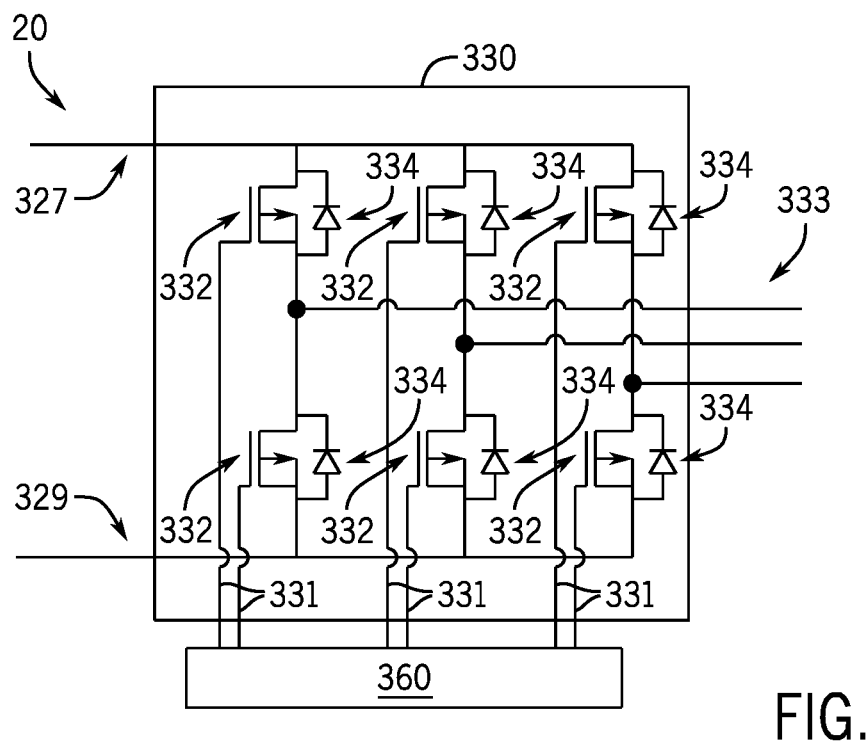
FIG. 10 is a partial schematic representation of the inverter in the motor drive of FIG. 9.

The DC bus 25 is connected in series between the input of the motor drive 12 and an inverter 330. Referring also to FIG. 10, the inverter 330 consists of switching elements, such as IGBTs, MOSFETs, thyristors, or SCRs as is known in the art. The illustrated inverter section 330 includes a MOSFET 332 and a free-wheeling diode 334 connected in pairs between the positive rail 327 and each phase of the output voltage as well as between the negative rail 329 and each phase of the output voltage. Each of the MOSFETs 332 receives control signals 331 to selectively enable the transistors 332 and to convert the DC voltage from the DC bus 20 into a controlled three phase output voltage to the motor 92. When enabled, each transistor 332 connects the respective rail 327, 329 of the DC bus 20 to an electrical conductor 333 connected between the transistor 332 and an output of the motor drive 12. The electrical conductor 333 is selected according to the application requirements (e.g., the rating of the motor drive 12) and may be, for example, a conductive surface on a circuit board to which the transistors 332 are mounted or a bus bar connected to a terminal from a power module in which the transistors 332 are contained. The output of the motor drive 12 may be connected to the motor 92 via a cable including electrical conductors connected to each of the output terminals.

One or more modules are used to control operation of the motor drive 12. According to the embodiment illustrated in FIG. 9, a controller 350 includes the modules and manages execution of the modules. The illustrated embodiment is not intended to be limiting and it is understood that various features of each module discussed below may be executed by another module and/or various combinations of other modules may be included in the controller 350 without deviating from the scope of the invention. The modules may be stored programs executed on one or more processors, logic circuits, or a combination thereof. The controller 350 may be implemented, for example, in a microprocessor, application specific integrated circuit (ASIC), field programmable gate array (FPGA), or other such customizable device. The motor drive 12 also includes a memory device 345 in communication with the controller 350. The memory device 345 may include transitory memory, non-transitory memory or a combination thereof. The memory device 345 may be configured to store data and programs, which include a series of instructions executable by the controller 350. It is contemplated that the memory device 345 may be a single device, multiple devices, or incorporated, for example, as a portion of another device such as an application specific integrated circuit (ASIC). The controller 350 is in communication with the memory 345 to read the instructions and data as required to control operation of the motor drive 12.

The controller 350 receives a command signal 347 identifying desired operation of the motor 92 connected to the motor drive 12. The command signal 347 may be, for example, a position command ($\theta^*$), a speed command ($\omega^*$), or a torque command ($T^*$). For a high performance servo control system, the command signal 347 is commonly a position command signal ($\theta^*$). For purposes of discussion herein, the command signal 347 will be the position command signal ($\theta^*$) as shown in FIG. 9. The motor drive 12 receives the command signal 347 at an input interface. The input interface may be configured to receive an analog signal having a range between zero and a positive voltage, a range between a maximum negative value and a maximum positive value, or any other suitable range according to application requirements. Optionally, the input interface is a communication interface configured to receive data packets according to a communication protocol. The communication protocol may be, for example, a standard Ethernet communication protocol or an industrial protocol such as the Common Industrial Protocol (CIP) executing on Ethernet/IP™, DeviceNet™, or ControlNet™, or any other suitable communication protocol. The input interface may further include analog-to-digital converters, communication buffers, memory, or other electronic devices as would be understood in the art to sample a signal and convert a data signal from one form to a digital value suitable for use in a processing device.

The controller 350 also receives feedback signals indicating the current operation of the motor drive 12. According to the illustrated embodiment, the controller 350 includes a feedback module 365 that may include, but is not limited to, analog to digital (A/D) converters, buffers, amplifiers, and any other components that would be necessary to convert a feedback signal in a first format to a signal in a second format suitable for use by the controller 350 as would be understood in the art The motor drive 12 may include a voltage sensor 351 and/or a current sensor 352 on the DC bus 20 generating a feedback signal corresponding to the magnitude of voltage and/or current present on the DC bus 20. The motor drive 12 may also include one or more voltage sensors 353 and/or current sensors 354 on the output phase (s) of the inverter 330 generating a feedback signal corresponding to the magnitude of voltage and/or current present on the electrical conductors 333 between the inverter 330 and the output of the motor drive. A position feedback device 94 may be connected to the motor 92 and operable to generate a position feedback signal ($\theta$) corresponding to the angular position of the motor 92.

The controller 350 utilizes the feedback signals and the command signal 347 to control operation of the inverter 330 to generate an output voltage having a desired magnitude and frequency for the motor 92. The feedback signals are processed by the feedback module 365 and converted, as necessary, to signals for the control module 355. The control module 355 includes control loops to receive an error signal, determined as a difference between the command signal 347 and a feedback signal. The control loops execute responsive to the command signal 347 and the feedback signals to generate a desired reference signal. The output of the control module 355 is a current reference signal provided to the current regulator 361. As is understood in the art, the current regulator 361 may independently regulate a torque producing component of the current and a flux producing component of the current. The current reference signal may include both a torque reference component and a flux reference component. Optionally, the flux reference component may be a fixed value and the current reference signal may consist just of a torque reference component. The current regulator 361 uses the torque reference component and a current feedback signal to output a voltage signal to a gate driver module 360. The gate driver module 360 generates the control signals 331, for example, by pulse width modulation (PWM) or by other modulation techniques. The control signals 331 subsequently enable/disable the transistors 332 to provide the desired output voltage to the motor 92, which, in turn, results in the desired operation of the mechanical load coupled to the motor 92. As is understood in the art, the current regulator 361 is configured to execute at a bandwidth sufficiently greater than the bandwidth of the control module 355 such that the current regulator 361 may be approximated as a unity gain to the control module 355.

Figure 11:
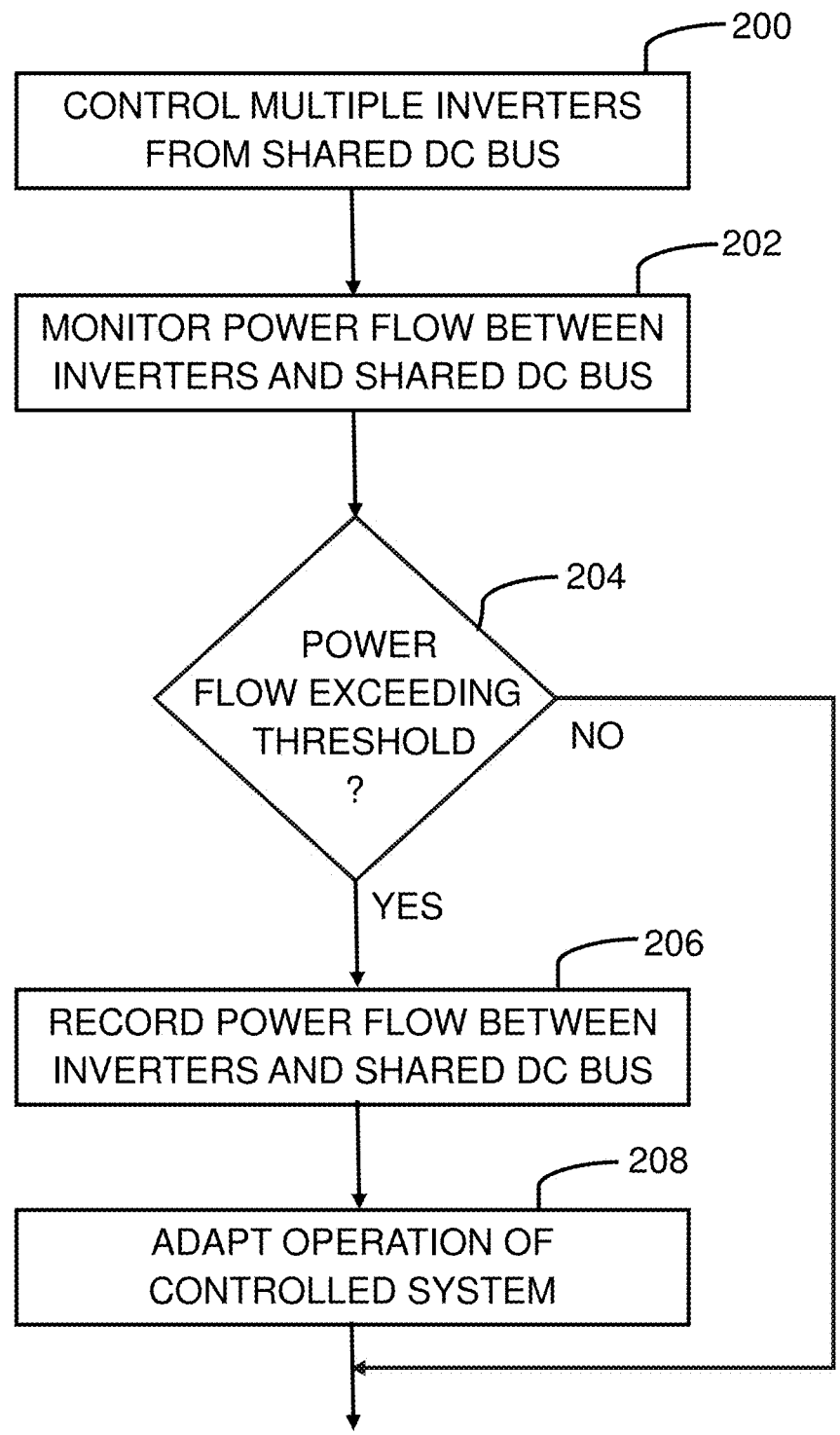
FIG. 11 is a flow diagram illustrating steps for one embodiment of reducing energy loss from multiple inverters utilizing the shared DC bus.

In operation, a module executing on the industrial controller 11, computer 80, or motor drive 12 is configured to monitor operation of the DC bus 20 and adapt operation of the industrial control system 10 in response to the observed operation. Turning next to FIG. 11, steps in the process of monitoring operation of the DC bus 20 are illustrated. At step 200, a control program executes on the processor module 73 for the industrial controller 11. The control program includes instructions for desired operation of the controlled machinery or process 96. These instructions are, in turn, used to generate motion commands for each motor 92 connected to one of the motor drives 12 to achieve the desired operation of the system. Each motor drive 12 controls the inverter 330 within the motor drive to convert the DC voltage present on the DC bus 20 to a variable voltage and variable frequency AC voltage output to the motor 92 connected to the corresponding motor drive. The motion commands received by each motor drive 12 are used to regulate the corresponding inverter 330 within the motor drive, such that multiple inverters are controlling operation of their corresponding motor 92 in tandem.

Each motor drive 12 is configured to monitor power flow between the DC bus 20 and the motor 92 being controlled by the motor drive 12. Each motor drive 12 may use the feedback signals from the current sensor 351 and the voltage sensor 352 to monitor an instantaneous level of power being drawn from or delivered to the DC bus 20 with the motor drive 12. The level of power may be further monitored over time to determine a level of energy being drawn from or delivered to the DC bus 20 with the motor drive 12. According to another aspect of the invention, the feedback signal from the current sensor 353 at the output of the inverter may be used to determine current flow through the motor drive 12 and may be used in place of a current sensor 351 operatively connected to the DC bus 20 to determine power flow in the motor drive 12.

According to one aspect of the invention, each motor drive 12 monitors the power flow between itself and the DC bus 20. During operation of the industrial control system 10, each motor 92 may be configured to operate in both the motoring and regenerative operating modes. A first duration may be defined which corresponds to a period of time during which each motor 92 is operating in a motoring operating mode, and the inverter 330 controlling operation of the motor is drawing current from the shared DC bus 20. A second duration may be defined which corresponds to a period of time during which each motor 92 is operating in a regenerative operating mode, and the inverter 330 controlling operation of the motor is delivering current back to the shared DC bus. The first duration and the second duration as defined above refer generally to operation in the motoring and regenerative operating modes and are not referring to a specific instance of operation. Each motor 92 may operate for multiple first or second durations, where each first or second duration has a different length of time. Each motor 92 may similarly operate in the motoring or regenerative operating mode for multiple runs before switching to the other operating mode. A motor 92 may switch between motoring and regenerative operation while receiving a single motion command, where a dynamic load causes the motor 92 to switch between operating modes. Each motor drive 12 utilizes current and voltage feedback signals within the motor drive 12 to determine whether the motor drive 12 is drawing power from or delivering power to the DC bus 20 and to determine the amplitude of power being transferred between the motor drive 12 and the DC bus 20.

The sum of power transferred between each of the motor drives 12 and the DC bus 20 may be determined and operation of the industrial control system 10 adapted if the sum of the power transferred exceeds a predefined threshold. During operation of the industrial control system 10, a first portion of the motor drives 12 may control the corresponding inverter 330 within the motor drive 12 to operate in the motoring operating mode, and a second portion of the motor drives 12 may control the corresponding inverter 330 within the motor drive 12 to operate in the regenerative operating mode. The sum or power flow between the DC bus 20 and each of the motor drives 12 includes the first portion of the motor drives drawing power from the DC bus 20 and the second portion of the motor drives delivering power to the DC bus 20. The total power flow, therefore, includes a portion of the motor drives 12 adding power to the DC bus and a portion of the motor drives subtracting power from the DC bus.

In an industrial control system 10, it is not uncommon for a motor 92 to execute an operation or a sequence of operations in a repeated manner. The controlled machine or process 96 may be, for example, a process line, where each motor drive 12 receives a motion command to perform one task in the process. The task is repeated for each product passing by the motor 92. As discussed above, each motor drive 12 may be connected to the other motor drives 12 or to the industrial controller 11 via the industrial control network 78. Each motor drive 12 may transmit values of the observed power flow within the motor drive 12 to a single processing unit. The single processing unit may be the processor module 73 in the industrial controller, a processor in the rectifier module 115, or the controller 350 in one of the motor drives 12. The single processing unit adds the values of the observed power within each motor drive to determine a total value of power being drawn from or delivered to the DC bus 20. Further, the single processing unit may identify a pattern of operation of the inverters in the controlled machine or process 96.

When inverters 330 are delivering power back to the shared DC bus 20, the amplitude of the DC bus voltage may begin to increase. The capacitors 124, 324 in the rectifier 115 and each motor drive 12 are configured to absorb some of the energy from regenerative operation of the motors 92. However, when the capacitors are fully charged, they cannot accept any further energy. As a result, the voltage on the DC bus begins to increase, and the excess energy being delivered to the DC bus must be dissipated in some manner. The shunt resistor 130 may be connected to the DC bus 20 to discharge excess energy. However, this energy is dissipated as heat and becomes waste energy within the industrial control system 10.

With reference again to FIG. 11, the amount of energy being dissipated across the shunt resistor may be reduced by steps 206 and 208 shown in the flow diagram. At step 206, the amount of power flow between each inverter 330 and the DC bus 20 is recorded during time periods in which the DC voltage has risen above the predefined threshold of step 204. If this predefined threshold is set equal to the threshold at which the shunt resistor 130 is connected to the DC bus 20, the amount of excess power being delivered to the DC bus 20 may be determined. Each motor drive 12 may maintain a record of the power flow between the corresponding inverter 330 in the motor drive and the DC bus 20. Optionally, the single processing unit may be configured to maintain a record of power flow between each of the inverters 330 and the DC bus 20.

Figure 12:
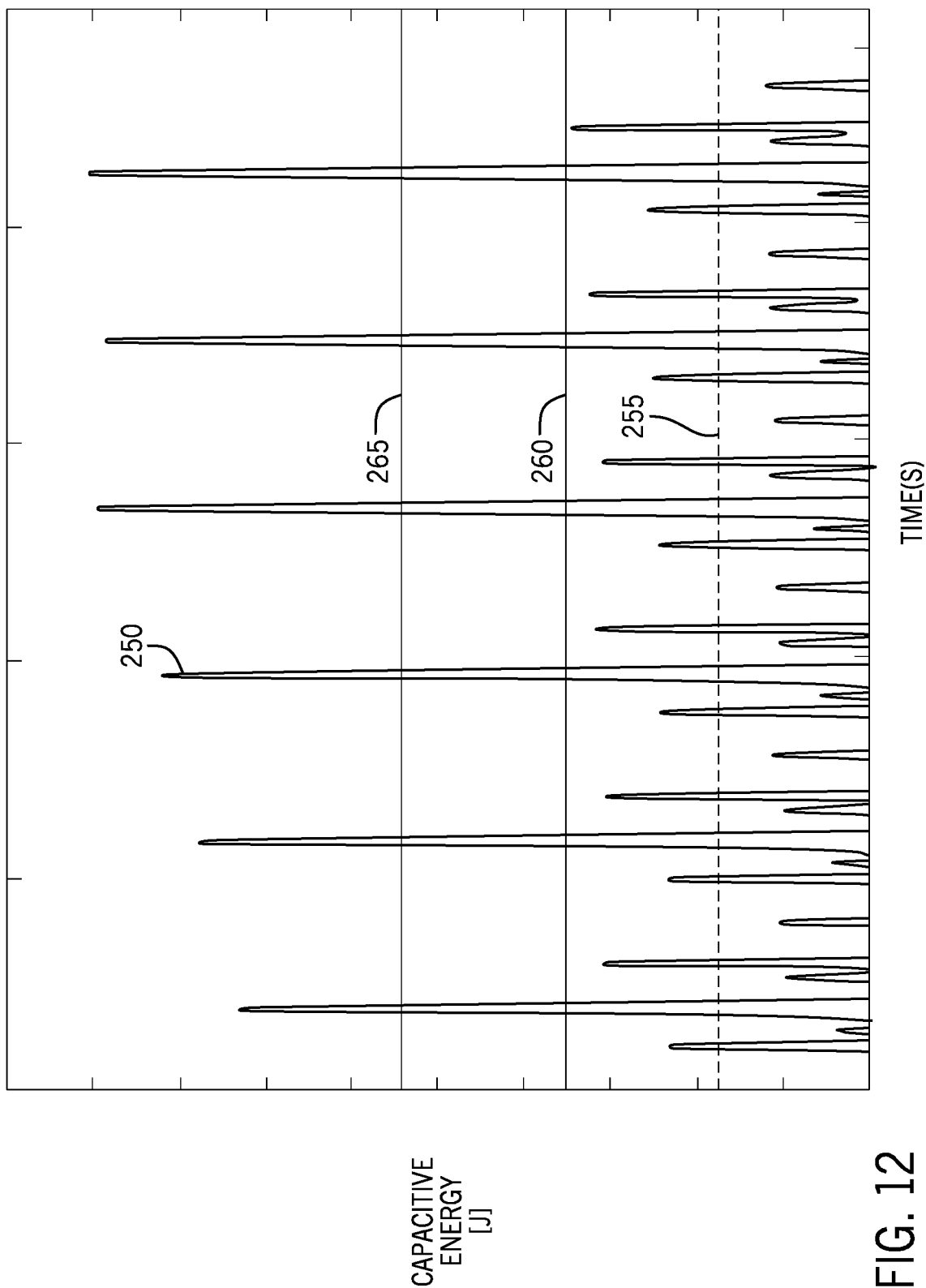
FIG. 12 is a graphical representation of total energy received in capacitors for multiple inverters connected to a shared DC bus if no energy is discharged via a shunt resistor.

Turning next to FIG. 12, a plot 250 of the total energy delivered to the DC bus 20 over time is illustrated. It is understood that a portion of the motors 92 may be operating in the motoring mode and a portion of the motors 92 may be operating in the regenerative mode. The motors 92 operating in the motoring mode require the corresponding inverter 330 to draw energy from the DC bus 20 and supply the energy to the motor 92. Motors 92 operating in the regenerative mode require the corresponding inverter 330 to deliver the energy generated by the motor 92 back to the DC bus 20. The time intervals in FIG. 12 where the plot 250 is at zero correspond to intervals when the total energy between all of the inverters 330 and the DC bus 20 requires energy to be drawn from the shared DC bus 20. During these intervals, the motors 92 require more motoring power drawn from the DC bus than regenerative power being supplied to the DC bus 20. The intervals in which the plot 250 is increasing above zero correspond to intervals when the motors 92 are supplying more regenerative energy to the bus 20 than motoring power being drawn from the bus.

The first line 255 on FIG. 12 corresponds to the total capacitive energy storage in the system. During intervals in which the plot 250 is below the first line 255, the capacitive energy storage of the capacitors 124, 324 in the rectifier 115 and each motor drive 12 are sufficient to absorb the regenerative energy generated by all of the motors 92 in the system. The voltage on the DC bus 20 does not increase or does not increase a sufficient amount to require the shunt resistor 130 to be connected across the DC bus 20. When the plot 250 is greater than the threshold illustrated by the first line 255, the amount of regenerative energy exceeds the capacitive energy storage in the system and the shunt resistor 130 is connected to discharge excess energy.

After recording the amount of power flow between each inverter 330 and the DC bus 20, as shown in step 206 of FIG. 11, operation of the system is adapted to reduce the total energy that must be dissipated by the shunt resistor, as shown in step 208. According to one aspect of the invention, operation of at least one of the inverters 330 is shifted in time to reduce the total energy delivered to the DC bus 20 by the inverters 330. As previously indicated, a portion of the motors 92 operate in a motoring mode and a portion of the motors operate in a regenerative mode. In a control system 10 utilizing a shared DC bus 20, the energy delivered to the DC bus by an inverter 330 controlling a motor in the regenerative operating mode may be drawn from the DC bus by an inverter 330 controlling a motor in the motoring operating mode. In some applications, timing of certain processes is not critical, and it may be possible to shift operation of one or more of the motos 92 in time to balance the number of motors 92 executing in the regenerative operating mode with the number of motors executing in the motoring operating mode.

As an initial step in balancing operation of the motors 92, one of the controllers maintains a record of when each motor operates in the motoring mode and in the regenerative mode. The controller 350 in the motor drive 12 may store a record of each first duration, corresponding to the period of time during which each motor 92 is operating in a motoring mode, and each second duration, corresponding to the period of time during which each motor 92 is operating in the regenerative mode. The controller 350 for each motor drive 12 may periodically transmit a record of the first and second periods to the industrial controller 11, which assembles a record of operation of each motor drive. Optionally, the motor drive 12 may transmit an indication of whether it is operating in the motoring or regenerative mode to the industrial controller 11, and the industrial controller may maintain a record of each first or second duration for each motor drive 12. Having a record of operation for each motor drive 12 during a first operation, or a first series of operations, for the industrial control system 10, the industrial controller determines a timing sequence which reduces the total energy required to be dissipated by the shunt resistor 130 during subsequent operations of the industrial control system. The industrial controller 11 may add a time offset 225 (see FIG. 14B) to motion commands generated by the control program executing in the processor module 73 to shift operation of one of the inverters 330 in time.

Figure 13A:
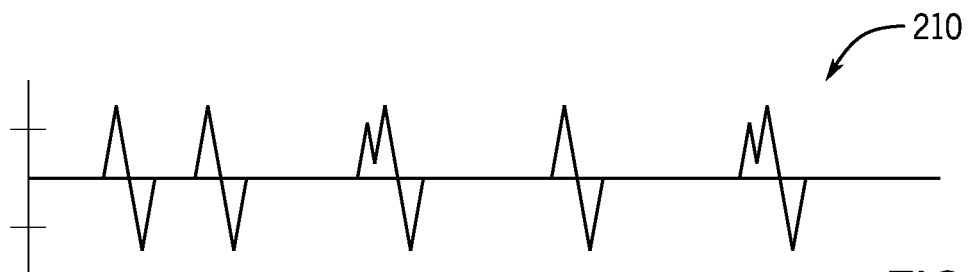
FIG. 13A is a graphical representation of energy transferred between a shared DC bus and a first inverter connected to the shared DC bus.
Figure 13B:
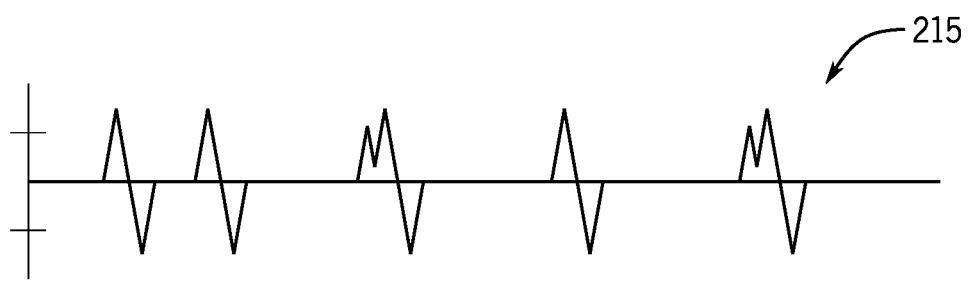
FIG. 13B is a graphical representation of energy transferred between a shared DC bus and a second inverter connected to the shared DC bus, where the first and second inverters execute the same motion profiles.
Figure 13C:
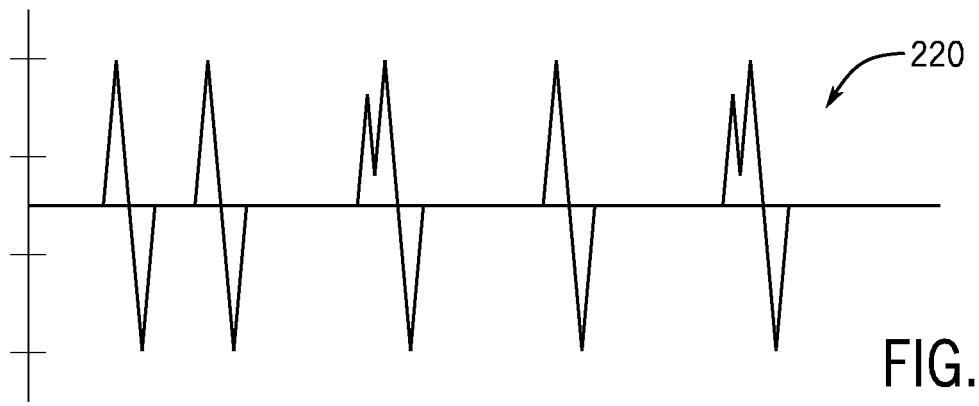
FIG. 13C is a graphical representation of the combined energy transferred between a shared DC bus and the first and second inverters connected to the shared DC bus, as illustrated in FIGS. 13A and 13B.

With reference next to FIGS. 13A-13C, exemplary waveforms for two motor drives 12 connected to a shared DC bus 20 are illustrated. A first waveform 210 in FIG. 13A illustrates power flowing between a first inverter and the shared DC bus. A second waveform 215 in FIG. 13B illustrates power flowing between a second inverter and the shared DC bus. According to the illustrated embodiment, each motor drive 12 and the motor 92 connected to the motor drive are the same and each motor drive 12 is configured to execute an identical motion command. The resulting power flow between the two motor drives 12 and the shared DC bus are, therefore, the same. When the waveform 210, 215 is positive, the corresponding inverter 330 is drawing power from the DC bus 20, and when the waveform 210, 215 is negative the corresponding inverter 330 is delivering power to the DC bus 20. Because the two motor drives are executing identical tasks at the same time, the power flow for each motor drive is identical and synchronized in time. FIG. 13C illustrates a summation of the overall power flow between both inverters 330 and the shared DC bus 20. Because the two inverters are drawing or delivering identical power flows, the resultant waveform 220 in FIG. 13C has a similar waveshape with double the amplitude of FIG. 13A or 13B.

Figure 14A:
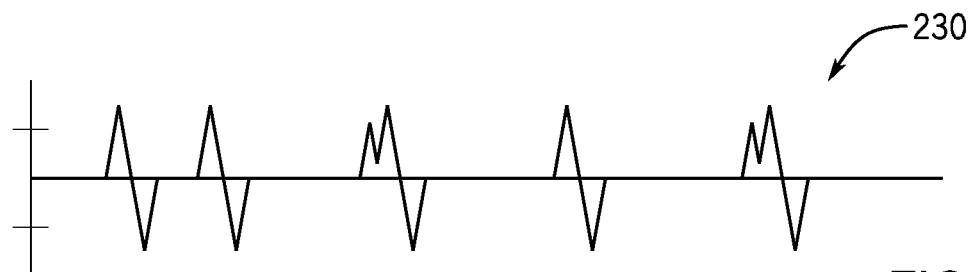
FIG. 14A is a graphical representation of energy transferred between a shared DC bus and a first inverter connected to the shared DC bus.
Figure 14B:
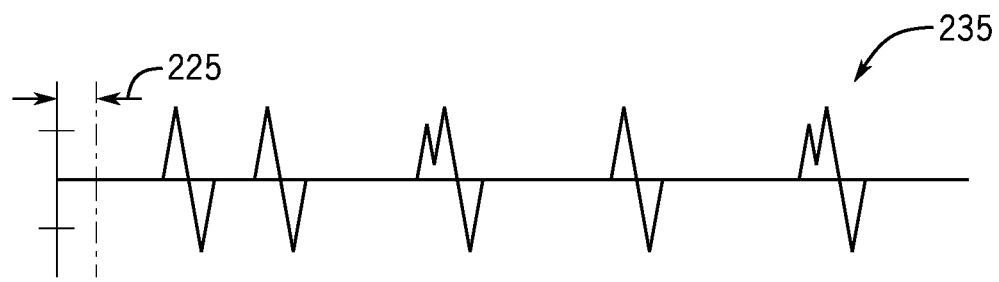
FIG. 14B is a graphical representation of energy transferred between a shared DC bus and a second inverter connected to the shared DC bus, where the first and second inverters execute the same motion profiles but the second motion profile is shifted in time with respect to the first motion profile.
Figure 14C:
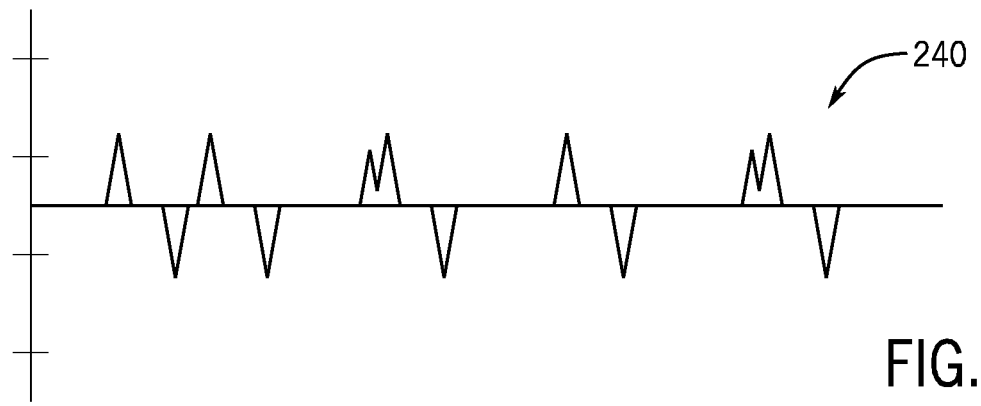
FIG. 14C is a graphical representation of the combined energy transferred between a shared DC bus and the first and second inverters connected to the shared DC bus, as illustrated in FIGS. 14A and 14B.

With reference then to FIGS. 14A-14C, a time offset 225 is added to operation of the second inverter 330 illustrated in FIG. 13B. The waveform 230 in FIG. 14A corresponds to the waveform in FIG. 13A. Operation of the motor 92 and corresponding inverter is identical between the two waveforms. The control program and corresponding motion command generated for the second motor 92, as illustrated in FIG. 14B, is the same as the motion command generated for the second motor 92, as illustrated in FIG. 13B. However, the industrial controller 11 has determined the time offset 225 for the second motor 92 and shifts in time delivery of the motion command by the time offset 225 which causes the second motor to operate according to the waveform 235 shown in FIG. 14B. With the applied time offset 225, the first and second motors operate in motoring and regenerative modes in a more balanced manner. FIG. 14C illustrates a summation of the overall power flow between both inverters 330 and the shared DC bus 20 of FIGS. 14A and 14B. Because operation of the second inverter has been shifted in time with respect to operation of the first inverter, the resultant waveform 240 in FIG. 14C has peak amplitudes that are reduced in comparison to the waveform 220 in FIG. 13C. The reduced waveform allows more regenerative energy to be absorbed in the capacity of the capacitors 124, 324 in the rectifier 115 and each motor drive 12 and reduces the amount of energy which needs to be dissipated by the shunt resistor 130.

In some applications, timing of the controlled processes may be more critical and shifting operation in time for one or more of the motors 92 may not be an option. In these applications, the industrial controller 11 may monitor total energy delivered to the DC bus 20 by the inverters during a first operation, or a first series of operations, of the industrial control system 10 and recommend additional capacitance to be added to the industrial control system 10 for subsequent operation to absorb at least a portion of the total energy. The motor drives 12, the industrial controller 11, or a combination thereof may record operation of each motor drive 12 in the first and second durations to identify motoring and regenerative operation, as discussed above. A summation of operation for all of the motor drives 12 may generate a plot of total energy delivered to the DC bus 20 for the industrial control system 10 similar to the plot 250 shown in FIG. 12. Optionally, the rectifier module 115 may monitor the feedback signals 138, 142 from the current and voltage sensors 136, 140 when the shunt resistor 130 is connected to the DC bus 20. The rectifier module 115 may, in turn, use the values of current and voltage to determine the amount of energy dissipated in the shunt resistor 130. Alternately, the rectifier module 115 may transmit the data to the industrial controller 11, and the industrial controller 11 may use the values of current and voltage to determine an amount of energy dissipated in the shunt resistor.

After determining the total level of energy delivered to the DC bus 20 from the distributed motor drives 12 or determining the level of energy dissipated by the shunt resistor 130, the industrial controller 11 may determine an additional level of capacitance to be added to the industrial control system. Capacitance may be added to the system by adding a capacitance module 16 to the DC bus 20. Each capacitance module has a cost and the cost may vary as a function of the capacitance included within the capacitance module. Energy dissipated as heat in the shunt resistor 130 similarly has a cost. If the energy dissipated in the shunt resistor 130 were instead stored within a capacitance module 16 the energy could be reused by the industrial control system 10 when one of the inverters 330 requires energy from the shared DC bus 20. The cost of energy over time can be determined and a payback window established for capturing the energy to recover the cost of adding a capacitance module to the system. The payback window may be a default setting such as one or two years. Optionally, the payback window may be configurable and set by an end user as the acceptable duration over which the cost of an additional capacitance module 16, or modules, is recovered.

With reference again to FIG. 12, the second line 260 and the third line 265 illustrate potential levels of capacitance for the system. The second line 260 may represent, for example, the additional energy that may be stored with the addition of a single capacitance module 16, and the third line 265 may represent, the additional energy that may be stored with the addition of two capacitance modules 16. The first line 255 corresponds to the amount of energy that may be stored by the existing capacitance available in the capacitors 124, 324 for the rectifier 115 and each motor drive 12 and also corresponds to the level at which the shunt resistor 130 is connected to the DC bus 20. As may be observed by the plot 250 of total energy, operation of the industrial control system 10 initially exceeds the threshold 255 for connecting the shunt resistor 130 regularly. The addition of a first capacitance module 16 may absorb the energy between lines 255 and 260, reducing the frequency at which the shunt resistor 130 needs to be connected and reducing the energy lost to heat via the shunt resistor. The system exceeds the second line 260 less frequently and for shorter durations than it exceeds the first line 255. The system further exceeds the third line 265 at about the same frequency as it exceeds the second line 260 but for still shorter durations than the second line 260 is exceeded. The industrial controller 11 may have the cost of energy stored in a parameter and may determine a payback window for adding each additional capacitance module 16. The industrial controller may determine, for example, that the payback window for adding the first capacitance module 16 is about one year and the payback window for adding the second capacitance module 16 is about two years. If the setting for the payback window is two years, then the industrial controller may generate a message, which may be transmitted to a technician, displayed on a screen, or otherwise communicated as to a recommendation that two additional capacitance modules 16 be added to the system.

Having received the recommendation, a technician may install the two additional capacitance modules 16 at a convenient time with respect to operation of the industrial control system. During subsequent operation of the industrial control system, the energy that had previously been dissipated as thermal energy via the shunt resistor 130 is now stored in the additional capacitance modules 16 and reused by the distributed motor drives 12.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for reducing energy loss in a multiple inverter system, the method comprising the steps of:
   providing a DC voltage to a plurality of inverters via a shared DC bus, wherein each of the plurality of inverters is configured to control operation of a motor operatively connected to a corresponding inverter;
   monitoring an amplitude of the DC voltage present on the shared DC bus;
   selectively drawing current from or delivering current to the shared DC bus with each of the plurality of inverters;
   monitoring an amplitude of the current drawn from or delivered to the shared DC bus by each of the plurality of inverters, wherein the monitoring includes:
      determining a plurality of first durations over a series of operations when each of the plurality of inverters is drawing current from the shared DC bus, and
      determining a plurality of second durations over the series of operations when each of the plurality of inverters is delivering current to the shared DC bus;

determining a level of energy delivered by at least one of the plurality of inverters to the shared DC bus when the amplitude of the DC voltage exceeds a predefined threshold during a first operation of the multiple inverter system; and shifting in time within the series of operations at least a portion of the plurality of first durations or a portion of the plurality of second durations within the series of operations to align with at least a portion of the plurality of second durations or a portion of the plurality of first durations, respectively, when the amplitude of the DC voltage exceeds the predefined threshold.

2. The method of claim 1 further comprising the steps of:

generating a motion command with a central controller for the motor connected to each of the plurality of inverters; and shifting in time delivery of the motion command for the motor connected to at least a portion of the plurality of inverters to align at least the portion of the plurality of first durations with at least the portion of the plurality of second durations.

3. The method of claim 2, further comprising the steps of:

determining an offset value for at least one of the plurality of inverters with the central controller; and transmitting the offset value from the central controller to the at least one of the plurality of inverters, wherein the at least one of the plurality of inverters receiving the offset value delays execution of a motion command generated by the central controller by the offset value.

4. The method of claim 1, wherein the step of providing the DC voltage to the plurality of inverters further comprises:

receiving an AC voltage at an input of a rectifier;
converting the AC voltage to the DC voltage; and
providing the DC voltage at an output of the rectifier.

5. The method of claim 4, wherein the rectifier is configured to:

monitor the amplitude of the DC voltage present on the shared DC bus;

monitor the amplitude of the current drawn from or delivered to the shared DC bus by each of the plurality of inverters;

determine the level of energy delivered by the plurality of inverters to the shared DC bus when the amplitude of the DC voltage exceeds the predefined threshold during the first operation of the multiple inverter system; and shifting in time at least the portion of the plurality of first durations within the series of operations to align with at least the portion of the plurality of second durations within the series of operations when the amplitude of the DC voltage exceeds the predefined threshold.

6. A system, comprising:

a DC bus operative to conduct a DC voltage;

a plurality of inverters electrically connected to the DC bus, wherein each of the plurality of inverters is operative to:

transfer power between the DC bus and a motor operatively connected to a corresponding inverter, and monitor an amplitude of current drawn from or delivered to the DC bus by the corresponding inverter;

a sensor operative to generate a feedback signal corresponding to an amplitude of the DC voltage present on the DC bus; and a controller operative to:

receive the feedback signal corresponding to the amplitude of the DC voltage present on the DC bus, receive data from each of the plurality of inverters corresponding to the amplitude of current drawn from or delivered to the DC bus by the corresponding inverter, determine a plurality of first durations over a series of operations when each of the plurality of inverters is drawing current from the shared DC bus, and determine a plurality of second durations over the series of operations when each of the plurality of inverters is delivering current to the shared DC bus, determine a level of energy delivered by the plurality of inverters to the DC bus when the amplitude of the DC voltage exceeds a predefined threshold during a first operation of the system, and shift in time at least a portion of the plurality of first durations within the series of operations to align with at least a portion of the plurality of second durations within the series of operations when the amplitude of the DC voltage exceeds the predefined threshold.

7. The system of claim 6, further comprising a programmable controller operative to execute a control program for desired operation of the system, wherein the controller is the programmable controller.

8. The system of claim 7, wherein the programmable controller is further operative to:

generate a motion command for the motor connected to each of the plurality of inverters, and shift in time delivery of the motion command for the motor connected to a first portion of the plurality of inverters with respect to delivery of the motion command for the motor connected to a second portion of the plurality of inverters.

9. The system of claim 7, wherein the programmable controller is further operative to:

generate a motion command for the motor connected to each of the plurality of inverters, determine an offset value for at least one of the plurality of inverters with the central controller, and transmit the offset value to the at least one of the plurality of inverters, and wherein the at least one of the plurality of inverters receiving the offset value delays execution of the motion command generated by the programmable controller by the offset value.

10. The system of claim 6, wherein the controller is one of the plurality of inverters.

11. The system of claim 6, further comprising a rectifier operative to:

receive an AC voltage at an input of the rectifier;
convert the AC voltage to the DC voltage; and
provide the DC voltage to the DC bus at an output of the rectifier.

12. The system of claim 11, wherein the controller is the rectifier.

13. A method for reducing energy loss in a multiple inverter system, the method comprising the steps of:

converting an AC voltage to a DC voltage with a rectifier;

delivering the DC voltage from the rectifier to a plurality of inverters via a shared DC bus, wherein each of the plurality of inverters is configured to control operation of a motor operatively connected to a corresponding inverter;

monitoring an amplitude of the DC voltage present on the shared DC bus;

determining a level of energy delivered by the plurality of inverters to the shared DC bus when the amplitude of the DC voltage exceeds a predefined threshold during a first operation of the multiple inverter system;

determining a cost of the energy delivered by the plurality of inverters to the shared DC bus;

determining a payback window for at least one capacitance module added to the DC bus; and determining a number of capacitance modules to add to the DC bus when the payback window is less than a predefined payback window.

14. The method of claim 13 further comprising the steps of:

adding the number of capacitance modules to the shared DC bus; and conducting at least a portion of the energy delivered by the plurality of inverters to the capacitance modules during at least one subsequent operation of the multiple inverter system.

* * * * *